United States Patent [19]
Marquet et al.

[11] Patent Number: 5,616,195
[45] Date of Patent: Apr. 1, 1997

[54] LOW ASPECT RATIO TRUCK TIRE

[75] Inventors: Michel E. J. Marquet, Bastogne; Phuoc T. Le, Attert, both of Belgium

[73] Assignee: The Goodyear Tire & Rubber Company, Akron, Ohio

[21] Appl. No.: 520,220

[22] Filed: Aug. 28, 1995

[51] Int. Cl.⁶ .............................. B60C 3/00; B60C 3/04; B60C 9/20; B60C 11/00
[52] U.S. Cl. ..................... 152/209 R; 152/454; 152/526; 152/534
[58] Field of Search ............................ 152/209 R, 454, 152/526, 534

[56] References Cited

FOREIGN PATENT DOCUMENTS

| | | | |
|---|---|---|---|
| 1319600 | 6/1993 | Canada | 152/454 |
| 2617096 | 12/1988 | France | 152/454 |

*Primary Examiner*—Adrienne C. Johnstone
*Attorney, Agent, or Firm*—David L. King

[57] ABSTRACT

An improved pneumatic radial ply truck tire 10 having an aspect ratio below 0.70 is designed to replace two conventional truck tires on the trailer axle of semi-trailers. These tires 10 are commonly referred to as Super Single Tires. The improved tire 10 has a radially outer tread surface 30 which is defined by three radii of curvature $R_1$, $R_2$, and $R_3$ on each side of the tread centerline $C_L$. Radii $R_1$ and $R_2$ are internal to the tire 10 whereas radius $R_3$ is external to the tire 10 and defines the outer surface 30C of the tread shoulder region. The combination of curvatures 30A, 30B and 30C yields a substantially rectangular contact patch greatly improving the treadwear rates of the tire 10. The tire 10 has the radius $R_2$ in the range of 1.3 to 2 times the radius of curvature $R_1$, the external radius $R_3$ is in the range of 0.7 to 2.5 times the first radius of curvature $R_1$, preferably in the range of 1.0 to 2.5 times $R_1$, and the shoulder rib 25A adjacent the tread edge 21 is chamfered.

11 Claims, 5 Drawing Sheets

LOW ASPECT RATIO TRUCK TIRE

BACKGROUND OF THE INVENTION

This invention relates to a radial ply pneumatic truck tire. More particularly it teaches an improved tread profile for a low aspect ratio tire commonly referred to in the tire art as a Super Single tire.

Historically in the mid 1960's, The Goodyear Tire & Rubber Company introduced a bias tire construction in which one such tire could replace two conventional truck tires on two axle semi-trailers. During 1965, the Bias Super Single tires were produced in Wolverhampton, England. The wear rate and overall durability of these tires were poor and therefore the cost benefits of a single tire versus two conventional tires in a dual fitment were not fully realized.

In the mid seventies Michelin introduced the first All Steel Radial Super Single tire. Goodyear around 1976 also introduced such a radial tire called the G165.

In Europe the tri-axle full trailers were introduced in Germany and tri-axle semi-trailers in France. These changes reduced the drive axle loads from typically 13 to 11 metric tons. The tri-axle gross vehicle weight (GVW) load was limited to 22 metric tons. This greatly increased to usage of Super Single tires. In the mid 1980's the Continental Europe GVW of tractor/semi-trailers and truck/full trailers was increased from 38 to 40 metric tons. This change in GVW- made two-axle semi-trailer vehicle in dual tire fitments uncompetitive in view of payload and thus forced truck line haul accounts to exchange old two-axle units with tri-axle ones, further increasing the demand for Super Single tires. The tri-axle trailer GVW was increased to 24 metric tons and the tire load was increased from 4,125 kg to 4,500 kg.

These increases in load limits have naturally required improved durability of the Super Single type tire. The truck owners and operators see their inventories of six Super Single tires and rims versus twelve conventional tires and rims per each tri-axle trailer as a signification cost advantage. The mounting of Super Single tire and rim assemblies is less labor intensive. The resultant weight savings when using Super Single tires means more payload can be carried and these wide tires have superior rolling resistance yielding fuel cost savings.

All these benefits are achievable if the tires can be designed with sufficient treadwear and durability. Truck tires are more than any other tire valued based on their load capacity and their miles of useful life. The present invention has significantly improved the useful life of this type of tire while also providing sufficient load capacity.

In the past the tread has been contoured employing a rather simple single or dual radius of curvature originating internal of the tire. This configuration can yield a footprint shape that resembles a butterfly on a wide low aspect ratio tire such as a Super Single. The present invention corrects this inherently poor wearing footprint shape and yields a substantially rectangular footprint that has no butterfly appearance.

SUMMARY OF THE INVENTION

A pneumatic radial ply truck tire 10 with an aspect ratio below 0.70 is described. The tire 10 has a tread 20, a casing 12 including two sidewalls 14,16, one or more radial plies 18 extending from and wrapped about two annular beads 13 and a belt reinforcement structure 15 located radially between the tread 20 and the plies 18.

The tread 20 has a plurality of circumferentially extending continuous grooves 22 delimiting or defining a plurality of tread ribs 25. The radially outer surfaces 26 of the plurality of tread ribs 25 define a radially outer tread surface 30. The axially outer edges 21 of the tread 20 are adjacent to the sides 23 of the tread. The distances halfway between the tread edges 21 define the centerline $C_l$ of the tread 20.

In a cross section of the tread 20, the radially outer tread surface 30 has a maximum diameter D at the tread centerline $C_L$ and, on each side of the centerline, three radii of curvature $R_1$, $R_2$, $R_3$. The first radius of curvature $R_1$ has its center C1 substantially on the equatorial plane or centerline $C_L$ and extends from a point P0 on the centerline $C_L$ of the tread 20 to a point P1 located in the range of between 30% and 50% of half the treadwidth from P0 defining thereby a first radially outer convex tread surface 30A. The second radius of curvature $R_2$ has its center C2 substantially on a line passing through P1 and C1 and extends from the point P1 to a point P2 located in the range of between 70% and 90% of half the treadwidth from P0 defining thereby a second radially outer convex tread surface 30B. The third radius of curvature $R_3$ has its center C3 external to the tire and substantially on a line passing through P2 and C2 and extending from the point P2 toward the tread edge 21 defining thereby a third radially outer concave tread surface 30C.

The second radius of curvature $R_2$ is in the range of 1.3 to 2 times the first radius of curvature $R_1$ and the third radius of curvature $R_3$ is in the range of 0.7 to 2.5 times the first radius of curvature $R_1$ preferably in the range of 1 to 2.5 times the first radius of curvature $R_1$. The third radius of curvature $R_3$ is in the range of 0.7 to 1.5 times the second radius of curvature $R_2$. The radius of curvature R ranges between 500 and 700 mm. The radius of curvature $R_3$ ranges between 450 and 1000 mm, preferably between 700 and 1000 ram. The point P1 is located at about 40% of half the treadwidth from P0 and the point P2 is located at about 80% of half the treadwidth from P0.

In the preferred embodiment tire 10 there are at least four circumferentially extending continuous grooves 22. The belt reinforcement structure 15 comprises four belts 15A,15B, 15C and 15D, the radially inner belt 15A being a split belt. The four belts have respectively belt cord inclinations with respect to the equatorial plane of the tire, starting with the radially inner belt 15A, of about 55° R, 21° R, 21° L and 21° L. The shoulder rib adjacent each tread edge 21 is chamfered. The axially outer surface of a sidewall portion 24 adjacent each tread edge 21 is defined in a cross section by a fourth radius of curvature $R_4$ ranging between 20 and 100 mm, having its center C4 external to the tire 10, the preferred tire having $R_4$ equal to 50 mm.

DEFINITIONS

"Apex" means an elastomeric filler located radially above the bead core and between the plies and the turnup ply.

"Aspect Ratio" means the ratio of its section height to its section width.

"Bead" means that part of the tire comprising an annular tensile member wrapped by ply cords and shaped, with or without other reinforcement elements such as flippers, chippers, apexes, toe guards and chafers, to fit the design rim.

"Belt Structure" or "Reinforcing Belts" means at least two annular layers or plies of parallel cords, woven or unwoven, underlying the tread, unanchored to the bead, and having both left and right cord angles in the range from 17° to 27° with respect to the equatorial plane of the tire.

"Casing" means the carcass, belt structure, beads, sidewalls, and all other components of the tire excepting the tread and undertread. The casing may be news unvulcanized rubber or previously vulcanized rubber to be fitted with a new tread.

"Chafers" refers to narrow strips of material placed around the outside of the bead to protect cord plies from the rim, distribute flexing above the rim, and to seal the tire.

"Circumferential" means lines or directions extending along the perimeter of the surface of the annular tread perpendicular to the axial direction.

"Cord" means one of the reinforcement strands of which the plies in the tire are comprised.

"Lateral" means an axial direction.

"Ply" means a continuous layer of rubber-coated parallel cords.

"Radial" and "radially" mean directions radially toward or away from the axis of rotation of the tire.

"Radial Ply Tire" means a belted or circumferentially-restricted pneumatic tire in which the ply cords which extend from bead to bead are laid at cord angles between 65° and 90° with respect to the equatorial plane of the tire.

"Section Height" means the radial distance from the nominal rim diameter to the outer diameter of the tire at its equatorial plane.

"Section Width" means the maximum linear distance parallel to the axis of the tire and between the exterior of its sidewalls when and after it has been inflated at normal pressure for 24 hours, but unloaded, excluding elevations of the sidewalls due to labeling, decoration or protective bands.

"Shoulder" means the upper portion of sidewall just below the tread edge, tread shoulder or shoulder rib means that portion of the tread near the shoulder.

"Sidewall" means that portion of a tire between the tread and the bead.

"Tread" means that portion of the tire that comes into contact with the road under normal inflation and load.

DETAILED DESCRIPTION OF THE PREFERRED EMBODIMENT

Figure 1:
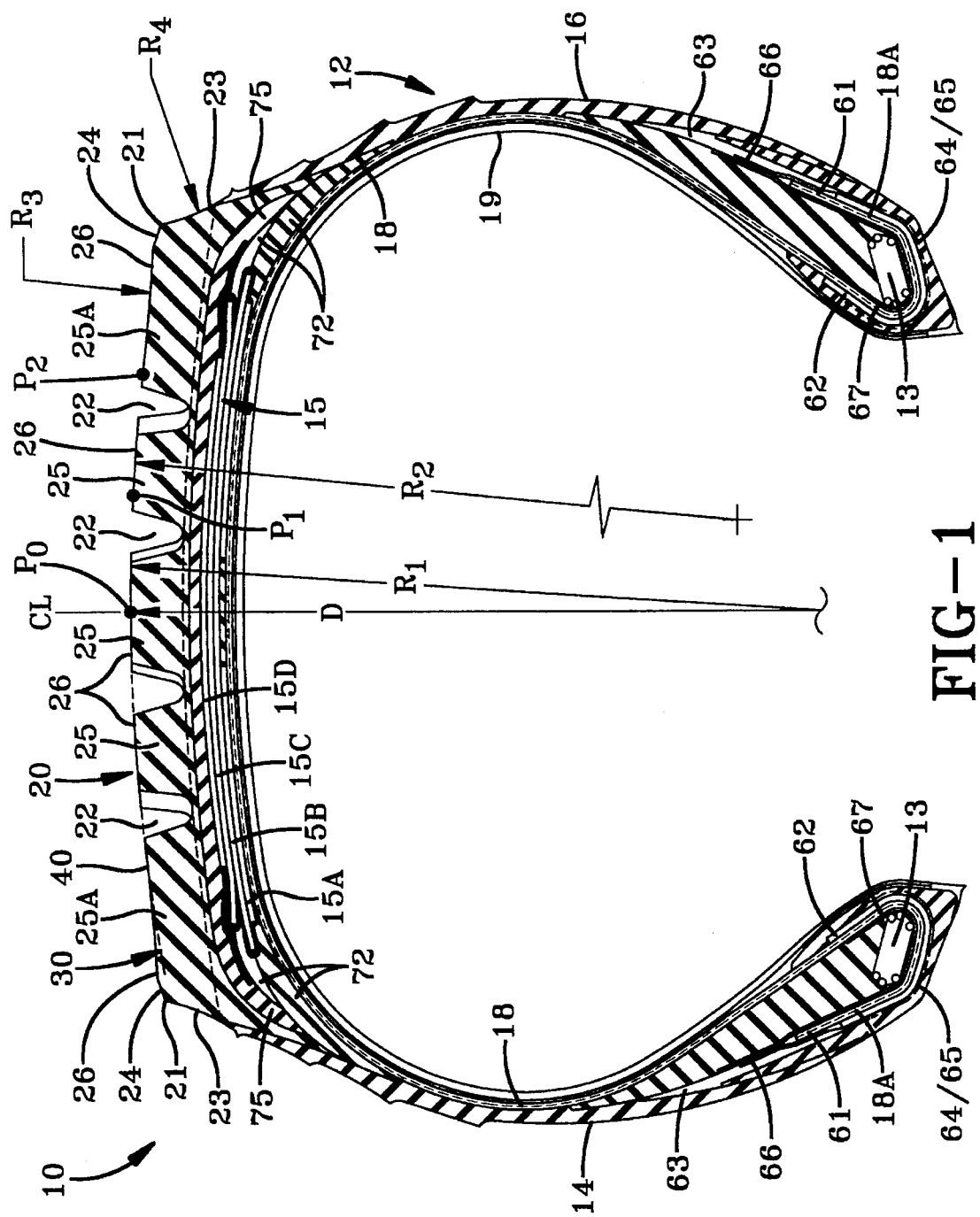
FIG. 1 is a cross sectional view of the preferred embodiment tire 10 according to the invention.

With reference to FIG. 1, a cross section of the pneumatic radial tire 10 for use preferably on free rolling axles of truck trailers is illustrated.

The tire 10 has a tread 20 and a casing 12. The casing 12 has two sidewalls 14, 16, one or more radial plies 18 extending from and wrapped about two annular beads 13 and a belt reinforcement structure 15 located radially between the tread 20 and the plies 18.

The plies 18 and the belt reinforcement structure 15 are cord reinforced elastomeric material, the cords being preferably steel wire filaments and the elastomer preferably being a vulcanized rubber material. Similarly, the annular beads 13 have steel wires wrapped into a bundle known as the bead core.

The liner 19 is a component of preferably halobutyl rubber that forms a somewhat air impervious chamber to contain the air pressure when the tire 10 is inflated.

The casing 12 of the preferred embodiment of the invention, as illustrated in FIG. 1, employs a bead 13 having a hexagonal bead core having an elastomeric apex 61 radially above the bead 13. The ply turnup 18A in the bead area is reinforced with a flipper 67, chipper 62, gum and fabric chafers 64,65, gum strips 66 and elastomeric wedges 63.

As shown, the belt structure of the preferred embodiment tire has four cord reinforced belts 15A,15B,15C and 15D. The radially innermost layer or belt 15A is divided into two axially spaced members, one member being on each half of the tread. This belt layer 15A is commonly referred to as a split belt. The cords are inclined at an angle of 55° R for the split belt member 15A. The remaining belts 15B,15C, and 15D have cord inclinations with respect to the equatorial plane of 21° R, 21° L and 21° L respectively.

Additionally, the belt reinforcement structure 15 includes a pair of gum strips of rubber material 75 and a plurality of elastomeric strips or wedges 72 in the lateral extremes of the belts 15 in proximity of the tread lateral edge. Although not required to the practice of the inventive concept, these features are disclosed as features employed in the preferred embodiment.

The tread 20 has a plurality of circumferentially continuous grooves 22, a pair of chamfered surfaces 24 located at the lateral extremes of the tread, and a plurality of tread ribs 25, including a pair of shoulder ribs 25A, each shoulder rib 25A having one chamfered surface 24. The tire illustrated in FIG. 1 according to the preferred embodiment has at least four circumferentially extending continuous grooves 22, the more preferred tire 10 having five of said circumferentially extending continuous grooves 22. More or less grooves may be used depending on the width of the tread and other design considerations.

As shown in FIG. 1, one circumferentially continuous annular chamfered surface 24 is adjacent each axially outer edge 21. The radially inwardly extending chamfered surface 24 of the shoulder rib 25A is not road contacting under static load or under normal load driving conditions when the tire is new. Accordingly, the footprint contact width of the new tire is narrower than when the tire tread 20 is worn. The chamfered surface 24 is believed to contribute to uniform tread wear. As the shoulder ribs 25A wear, the rib depth is reduced and the shoulder rib 25A becomes stiffer. Additionally, the rib 25A becomes effectively wider absorbing more load. This means that as the tire 10 wears its rate of tread wear actually slows or is retarded due to this unique feature. This feature when combined with a unique contour which actually increases the depth of the shoulder rib 25A enables the tire 10 to have surprisingly good wear performance.

The distance halfway between the axially outer edges 21 of the tread 20, as shown in FIG. 1, defines the centerline $C_L$ or equatorial plane of the tread 20. The axially outer edge 21 is adjacent to the tread sides 23 of the shoulder rib 25A and for the purposes of this invention the edges 21 are the radially innermost edge of the chamfered surface 24.

The radially outer road contacting surfaces 26 of the plurality of tread ribs 25 define a radially outer tread surface 30. The outer tread surface 30 is adjacent to and extends between the pair of chamfered surfaces 24.

Figure 1A:
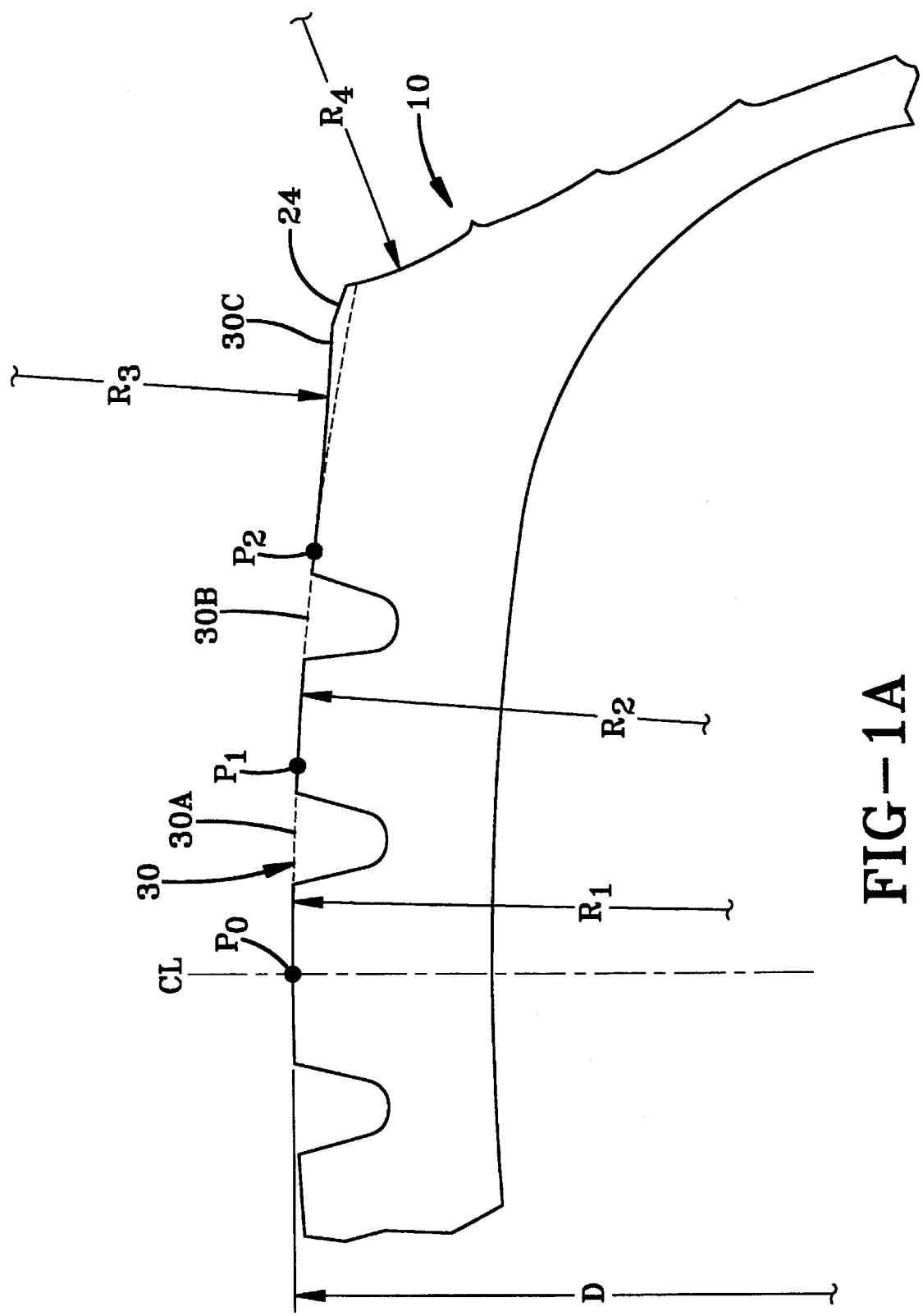
FIG. 1A is an outline of an enlarged portion of the cross sectional view of FIG. 1 showing in greater detail the tread contour features.
Figure 1B:
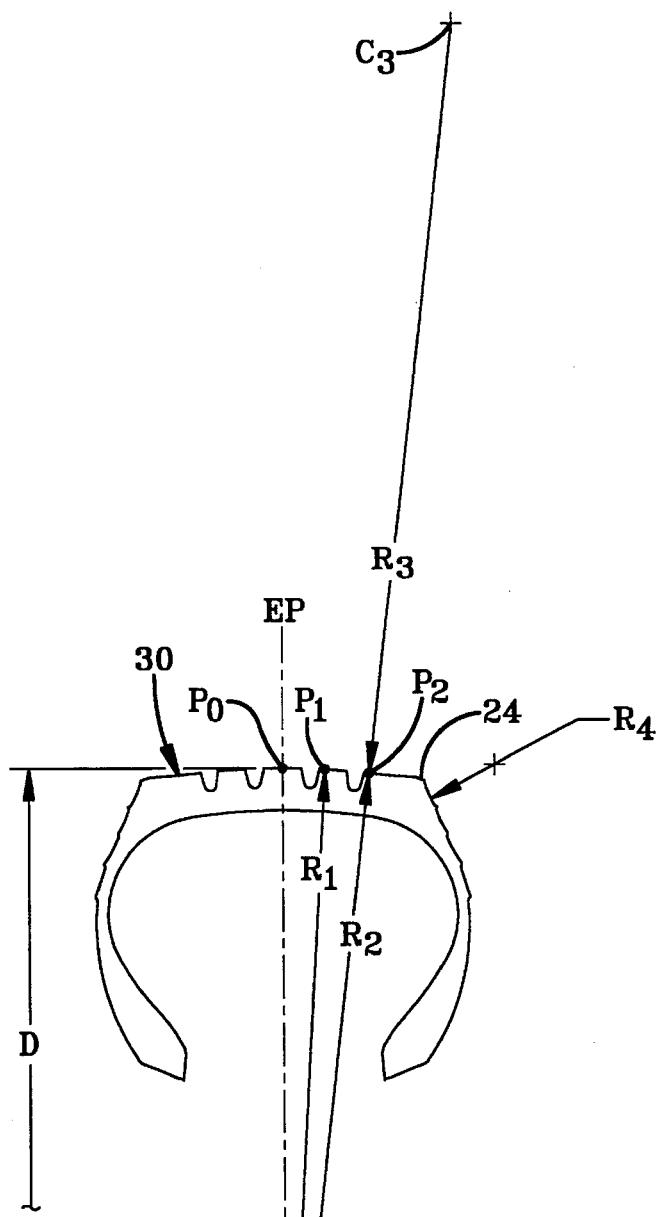
FIG. 1B is a view of a reduced portion of the tread contour of FIG. 1B showing the origins and intersections of the radii of the preferred tire according to the invention.

As illustrated in FIGS. 1, 1A and 1B the radially outer tread surface 30 has a maximum diameter D at the tread centerline $C_L$ and a constant internal radius of curvature $R_1$ extending laterally outwardly from the equatorial plane or tread centerline $C_L$. The constant internal radius of curvature $R_1$ is preferably less than the maximum diameter D and originates at a location P0 on the centerline $C_L$ of the tread 20.

The first radius of curvature $R_1$, having its center C1 substantially on the equatorial plane, extends from a point P0 on the centerline $C_L$ of the tread to a point P1 on each tread half located in the range of between 30% and 50% of half the treadwidth from P0 defining thereby a first radially outer convex tread surface 30A.

As further shown in FIGS. 1, 1A and 1B at the point $P_1$ located on each half of the tread 20, the curvature of the radially outer tread surface 30 changes wherein the tread surface 30 has a second radius of curvature $R_2$, also originating internal to the tire 10. As shown in FIG. 1B, the second radius of curvature $R_2$, having its center C2 substantially on a line passing through P1 and C1, extends from the point P1 to a point P2 located in the range of between 70% and 90% of half the treadwidth from P0 defining thereby a second radially outer convex tread surface 30B as shown in FIG. 1A.

A third radius of curvature $R_3$ has its center C3 external to the tire and substantially on a line passing through P2 and C2 and extending from the point P2 toward the tread edge 21 adjacent the chamfered surface 24 defining thereby a third radially outer concave tread surface 30C.

The combination of radially outer surfaces 30A, 30B, and 30C define a contour as shown in FIG. 1A wherein the surface 30 is represented as a line extending across tread grooves 22 as shown. The grooves 22 have a radial depth extending from the surface 30 to the base of the grooves 22. The contour of the outer surface 30 effectively changes the tread thickness to accomplish a rectangular contact patch or footprint. As shown in FIG. 1A the phantom dashed line from point P2 axially outwardly extending has the curvature $R_2$, but the actual tread contour has the external curvature $R_3$ thus demonstrating the tread rubber thickness that has been added to the shoulder tread ribs 25A which both enhances wear and improves the footprint profile.

The tire 10 preferably has a relationship between the first, second and third radii of curvatures such that the second radius of curvature $R_2$ is in the range of 1.3 to 2 times the first radius of curvature $R_1$ and the third radius of curvature $R_3$ is in the range of 0.7 to 2.5 times the first radius of curvature $R_1$, preferably 1.0 to 2.5 times $R_1$. Preferably the third radius of curvature $R_3$ is in the range of 0.7 to 1.5 times the second radius of curvature $R_2$. The radii are preferably oriented such that the adjacent portions of the tread contour are tangent. This relationship is achieved as shown in FIG. 1B.

The tire 10 as illustrated in FIG. 1 has the radius of curvature $R_1$ ranging between 500 and 700 mm and the radius of curvature $R_3$ ranging between 450 and 1000 mm, preferably 700 and 1000 mm.

The tire according to the preferred embodiment has the point located at about 40% of half the treadwidth from P0 and he point P2 located at about 80% of half the treadwith from P0.

The tire according to FIG. 1 has the tread side portions 23 adjacent the chamfered surface 24 and the axially outer edge 21 defined in a cross section by a fourth radius of curvature $R_4$ ranging between 20 and 100 mm., $R_4$ having its center C4 external to the tire, the preferred tire 10 having $R_4$ equal to 50 mm.

Figure 3:
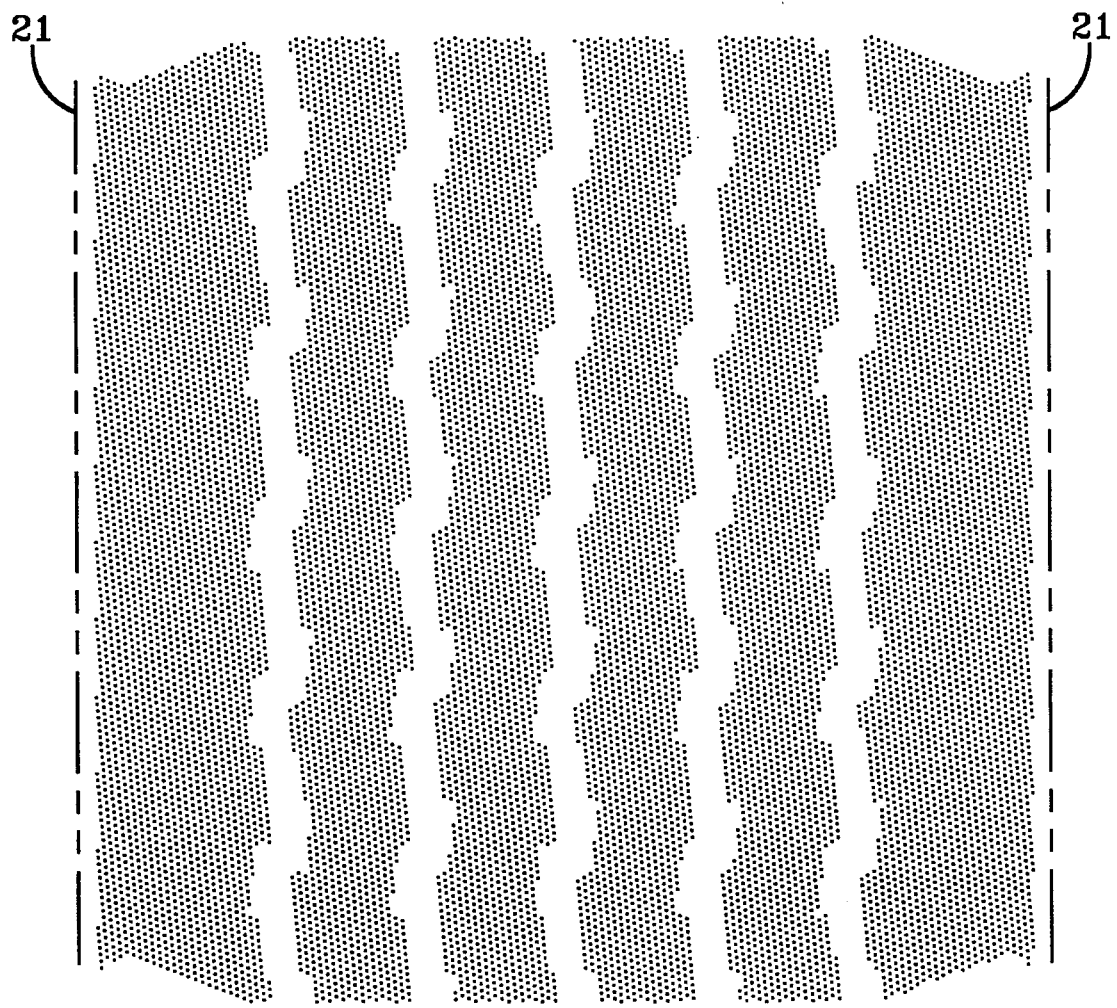
FIG. 3 is an exemplary illustration of the footprint of the preferred embodiment tire 10 of FIG. 1.

The tire 10 when statically loaded exhibits a footprint as illustrated in FIG. 3. The axially outer edge 21 is shown in phantom because it is located on a noncontacting portion of the chamfered surface 24. The distance between edge 21 and the contacting edge is the axial width of the chamfered surface 24.

AS shown the footprint is substantially rectangular with the leading and trailing edges being slightly convex.

Figure 2:
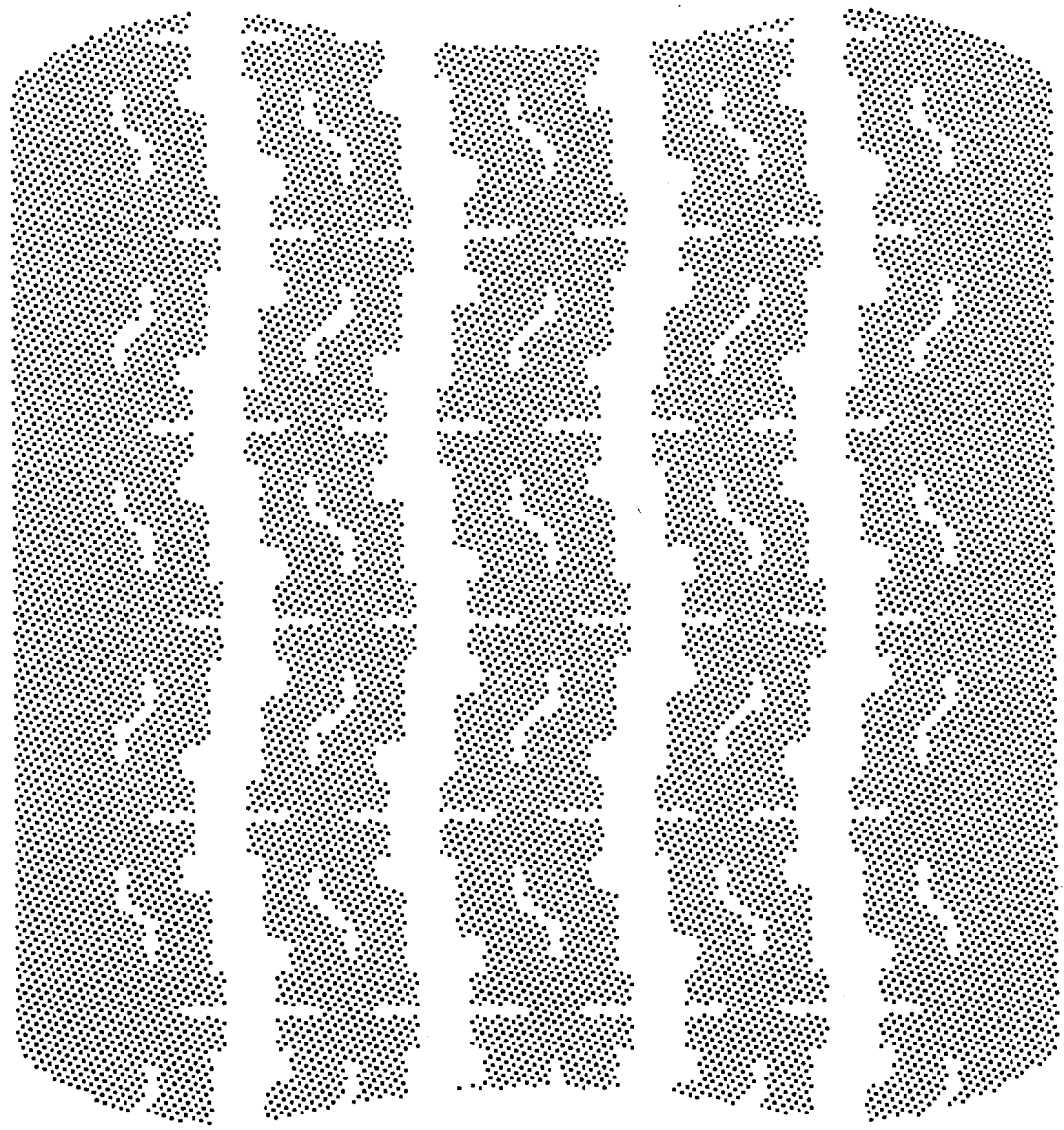
FIG. 2 is an exemplary illustration of a Super Single tire footprint of the prior art radial tire exhibiting a butterfly shape.

FIG. 2 illustrates a Goodyear G159 Super Single tire footprint.

Referring to the footprint shown in FIG. 2 of this prior art Super Single tire, a butterfly shape is exhibited wherein the leading and trailing edges of the footprint are concave. This means that the shoulder ribs are proportionately entering footprint prior to the central portion of the tread. Also as is readily apparent the load is effectively supported nonuniformly with the shoulder ribs carrying a disproportionate amount of the load. These shoulder ribs accordingly wear more rapidly and more nonuniformly compared to the lighter loaded center portion of the tread.

Referring back to the present invention tire footprint of FIG. 3, the shoulder ribs 25A and the center ribs 25 actually more proportionately carry the vehicle load and as a result more uniform tread wear results.

Test results show the comparable wear rates of the experimental tire according to the present invention superior to the prior art tire of similar size and materials. In test comparing wear rates of tri-axle trailers the results indicated that tread wear ranged from 0% to 28% improved dependent on axle position and other factors. In all cases the shoulder rib 25A appearance was greatly improved after 80,000 km of actual wear. The tires, overall durability has also been noticeably improved with projected mileage being up to 340,000 km and more dependent on axle position.

What is claimed is:

1. A pneumatic radial ply truck tire with an aspect ratio below 0.70 having a tread, a casing including two sidewalls, one or more radial plies extending from and wrapped about two annular beads and a belt reinforcement structure located radially between the tread and the plies, the tread having a plurality of circumferentially extending continuous grooves delimiting a plurality of tread ribs, the radially outer surfaces of the plurality of tread ribs defining a radially outer tread surface, the axially outer edges of the tread surface being adjacent to the sidewalls, the distance halfway between the tread edges defining the centerline of the tread:

in a cross section of the tread, the radially outer tread surface has a maximum diameter D at the tread centerline and, on each side of the centerline, three radii of curvature $R_1$, $R_2$, and $R_3$ wherein the first radius of curvature $R_1$, having its center C1 substantially on the equatorial plane, extends from a point P0 on the centerline of the tread to a point P1 located in the range of between 30% and 50% of half the treadwidth from P0 defining thereby a first radially outer convex tread surface;

the second radius of curvature $R_2$, having its center C2 substantially on a line passing through P1 and C1, extends from the point P1 to a point P2 located in the range of between 70% and 90% of half the treadwidth from P0 defining thereby a second radially outer convex tread surface;

the third radius of curvature $R_3$, having its center C3 external to the tire and substantially on a line passing through P2 and C2 and extending from the point P2 to the tread edge defining thereby a third radially outer concave tread surface.

2. The tire according to claim 1 wherein the second radius of curvature $R_2$ is in the range of 1.3 to 2 times the first radius of curvature $R_1$ and the third radius of curvature $R_3$ is in the range of 0.7 to 2.5 times the first radius of curvature $R_1$.

3. The tire according to claim 1 wherein the third radius of curvature $R_3$ is in the range of 0.7 to 1.5 times the second radius of curvature $R_2$.

4. The tire according to claim 1 wherein the radius of curvature $R_1$ ranges between 500 and 700 mm.

5. The tire according to claim 1 wherein the radius of curvature $R_3$ ranges between 450 and 1000 mm.

6. The tire according to claim 1 wherein the point P1 is located at about 40% of half the treadwidth from P0 and the point P2 is located at about 80% of half the treadwidth from P0.

7. The tire according to claim 1 wherein there are five of said circumferentially extending continuous grooves.

8. The tire according to claim 1 wherein the belt reinforcement structure comprises four belts, the radially inner belt being a split belt.

9. The tire according to claim 8 wherein the belt reinforcement structure comprises four belts having respectively belt cord inclinations with respect to the equatorial plane of the tire, starting with the radially inner split-belt, of about 55° R, 21° R, 21° L and 21° L.

10. The tire according to claim 1 wherein the shoulder rib adjacent each tread edge is chamfered.

11. The tire according to claim 1 wherein the axially outer surface of a sidewall portion adjacent each tread edge is defined in a cross section by a fourth radius of curvature $R_4$ ranging between 20 and 100 mm, having its center C4 external to the tire.

* * * * *